(12) United States Patent
Schrattenecker

(10) Patent No.: US 10,362,735 B2
(45) Date of Patent: *Jul. 30, 2019

(54) HARVESTING ATTACHMENT FOR A HARVESTER

(75) Inventor: Franz Schrattenecker, Eggerding (AT)

(73) Assignees: BISO Schrattenecker GmbH, Ort im Innkreis (AT); CNH Industrial Belgium nv, Zedelgem (BE)

( * ) Notice: Subject to any disclaimer, the term of this patent is extended or adjusted under 35 U.S.C. 154(b) by 426 days.

This patent is subject to a terminal disclaimer.

(21) Appl. No.: 13/989,938

(22) PCT Filed: Nov. 28, 2011

(86) PCT No.: PCT/EP2011/071095
§ 371 (c)(1),
(2), (4) Date: May 12, 2017

(87) PCT Pub. No.: WO2012/072525
PCT Pub. Date: Jun. 7, 2012

(65) Prior Publication Data
US 2017/0290265 A1    Oct. 12, 2017

(30) Foreign Application Priority Data
Nov. 29, 2010 (DE) .................. 10 2010 052 816

(51) Int. Cl.
*A01D 41/14* (2006.01)
*A01D 75/00* (2006.01)

(52) U.S. Cl.
CPC .................. *A01D 41/14* (2013.01)

(58) Field of Classification Search
CPC .... A01D 41/14; A01D 41/148; A01D 41/145; A01D 41/00; A01D 45/021; A01D 57/20; A01D 67/00; B65G 15/26; B65G 21/02; B65G 21/14
USPC ........ 56/51, 153, 228, 320.1, 208, 119, 466, 56/53; 198/313, 594
See application file for complete search history.

(56) References Cited

U.S. PATENT DOCUMENTS

| | | | |
|---|---|---|---|
| 3,598,224 A | 8/1971 | Oury | |
| 4,569,626 A | 2/1986 | Svanberg | |
| 5,671,595 A | 9/1997 | Bürmann | |
| 5,842,332 A | 12/1998 | Schreiner | |
| 7,082,742 B2 | 8/2006 | Schrattenecker | |
| 7,475,529 B2 | 1/2009 | Wubbels et al. | |
| 7,827,773 B2 * | 11/2010 | Sauerwein | A01D 57/20 56/181 |
| 7,971,420 B1 * | 7/2011 | Bollin | A01D 41/145 56/208 |
| 8,061,114 B2 * | 11/2011 | Mossman | A01D 45/021 56/119 |
| 8,186,502 B2 * | 5/2012 | Mackin | B65G 15/26 198/313 |
| 8,756,904 B2 | 6/2014 | Schrattenecker | |

(Continued)

FOREIGN PATENT DOCUMENTS

| | | |
|---|---|---|
| CN | 101375659 A | 3/2009 |
| DE | 3245372 C2 | 6/1984 |
| FR | 2549345 A3 | 1/1985 |

*Primary Examiner* — Robert E Pezzuto
(74) *Attorney, Agent, or Firm* — Peter K. Zacharias; Patrick M. Sheldrake

(57) ABSTRACT

A harvesting attachment for a harvester comprises a frame which includes a rear wall and a base wall. The frame is formed as an extrusion profile.

11 Claims, 13 Drawing Sheets

(56) References Cited

U.S. PATENT DOCUMENTS

| | | |
|---|---|---|
| 2001/0017182 A1 | 8/2001 | Takahashi |
| 2005/0115217 A1 | 6/2005 | Schrattenecker |
| 2010/0326035 A1 | 12/2010 | Schrattenecker |
| 2011/0253503 A1 | 10/2011 | Mackin et al. |

\* cited by examiner

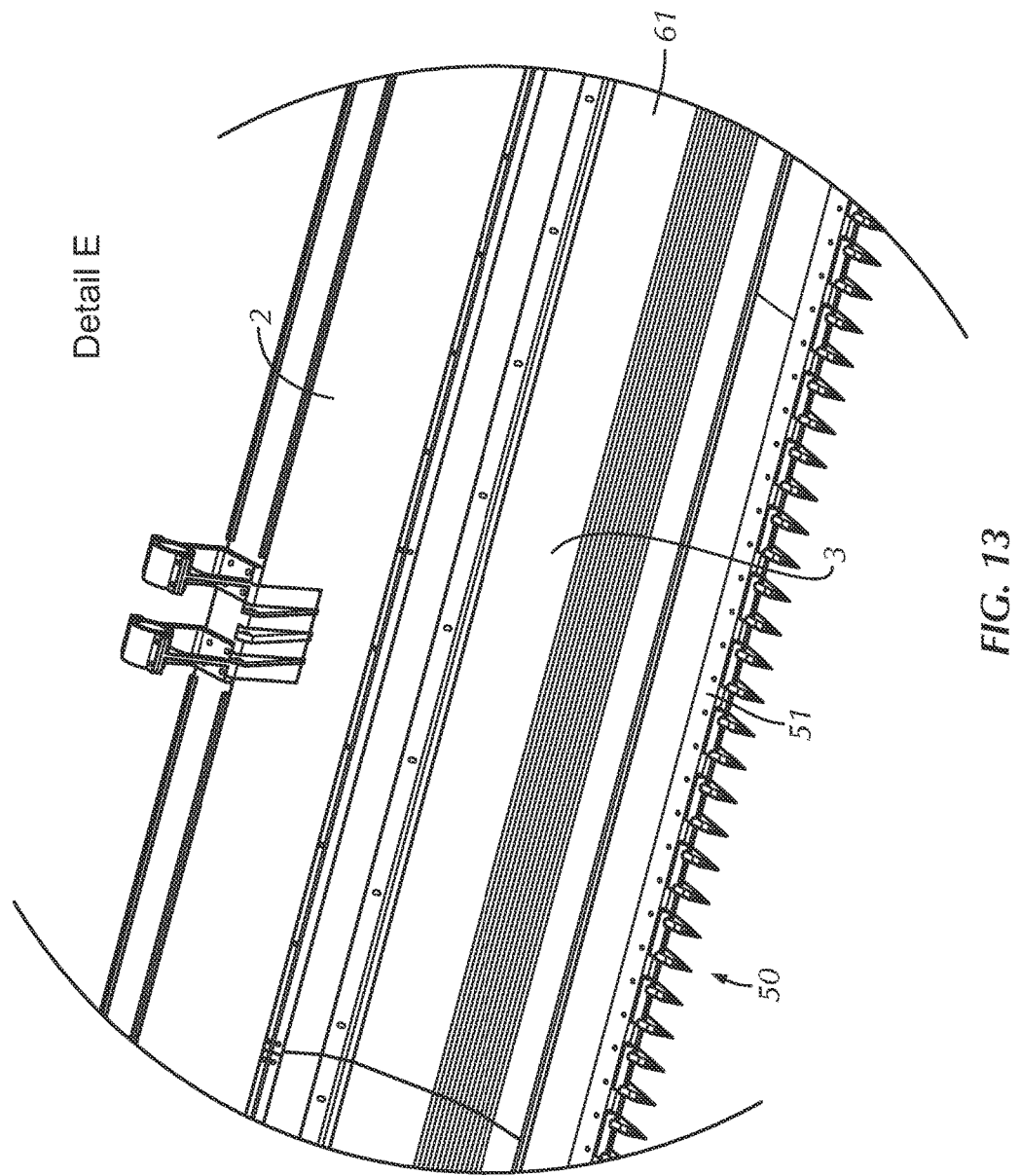

HARVESTING ATTACHMENT FOR A HARVESTER

CROSS REFERENCE TO RELATED APPLICATION

This application is the US National Stage filing of International Application Serial No. PCT/EP2011/071095 filed on Nov. 28, 2011 which claims priority to German Application DE 10.2010.052.816.1 filed Nov. 29, 2010, each of which is incorporated herein by reference in its entirety.

FIELD OF THE INVENTION

The invention relates to a harvesting attachment for a harvester having a frame which includes a rear wall and a bottom or base. The harvesting attachment can furthermore have one or two side walls at its ends. The frame of the harvesting attachment can serve to receive different harvesting tools, in particular for receiving a cutting unit.

BACKGROUND OF THE INVENTION

The harvesting attachment can be fastened to a harvester, in particular to a combine harvester. It is moved in a forward direction over a field by means of an agricultural harvester during harvesting operation and serves to receive specific crops. The harvesting attachment, for example, includes a cutting unit, a reel, a cutting bar, crop dividers and/or side cutters and/or further required components. The harvesting attachment is preferably mountable or mounted to the front of a harvester, in particular of a combine harvester. It can comprise a corn adapter such as in particular used in a forage harvester.

It is currently generally very largely desired in the agricultural machine industry to provide ever wider harvesting attachments for self-propelled harvesting machines which enable a farmer to harvest a field in a shorter time and with fewer passages. The maximum working width of a harvesting attachment is, however, restricted with respect to the stability of the construction due to increasing material load following from the amount of material used. For instance, in this respect, axial area moments of inertia play an important role and are a measure for the resistance of the cross-section of the harvesting attachment to bending. Furthermore, applied torsion forces have to be taken into account in the dimensioning of the harvesting attachment. Since increasing the width of the harvesting attachment generates a continuous increase in inherent weight, the forces, and in particular the bending moment, which act on the harvesting attachment increase further.

SUMMARY OF THE INVENTION

A harvesting attachment for a combine harvester is known from DE 10 2004008 342 A 1 which includes a frame at which a cross-member extends horizontally and transversely to the forward direction.

A harvesting apparatus for harvesters is known from DE 32 45 372 C2 having a receiving platform which comprises a horizontally extending bottom, a rear wall and left and right side walls.

DE 44 28 857 C1 discloses a receiving table for harvesters which can be assembled within a predefined pattern in modular form to form a functional, compact assembly for harvesters having different working widths.

A cutting unit for a combine harvester is known from EP 1 453 372 B1, the unit comprising a frame which includes a rear wall, two side walls and a bottom or base which form a trough and serve as a cutting table. The base is composed of a rear base part fixed to the frame and of a front base part guided for sliding adjustment in the direction of travel relative to the frame for adapting the cutting table length to the respective harvesting conditions.

German patent application 10 2009 030 548.3 shows a harvesting attachment for a harvester having a frame which has an outer wall which forms a hollow space, with at least one brace being arranged in the hollow space. The frame has an L-shaped angular form. It can be made from aluminum by means of a metal casting process.

It is the object of the invention to provide an improved harvesting attachment of the initially named type.

This object is achieved in accordance with the invention by the features of claim 1. The frame is conceived as an extrusion or continuous casting profile. Since the frame is manufactured in an extrusion process, this frame has a reduced inherent weight and/or increased strength. The harvesting attachment can therefore have a lower weight in comparison with previously known harvesting attachments with a specific working width. It is furthermore possible to manufacture a harvesting attachment having a larger working width.

Advantageous further developments are described in the dependent claims.

It is advantageous if the frame is made as a light metal extrusion profile. A suitable light metal is in particular aluminum or a light metal containing aluminum.

An advantageous further development is characterized by a curved connection wall between the rear wall and the base wall. The connection wall serves to connect the rear wall to the base. It is advantageous if the rear wall is straight. The base wall preferably is likewise straight. It can, however, comprise curved sections, in particular a curved end section.

It is advantageous if the frame is composed of a plurality of extrusion profile parts. The extrusion profiles are connected to one another. They can be releasably or non-releasably connected to one another. It is advantageous to provide the connection points at those locations of the frame at which the load, in particular the bending load, is small, preferably at those locations at which the load, in particular the bending load, is at a minimum. The connection points can in particular be provided at those points of the frame at which the finite element calculation of the load, in particular of the bending load, shows minima.

The extrusion profile parts are preferably welded to one another. The extruded parts can instead or additionally also be adhesively bonded to one another.

A further advantageous further development is characterized in that the frame is composed of an extrusion profile rear wall, an extrusion profile base wall and a curved extrusion profile connection wall.

It is advantageous if the extrusion profile and/or the extrusion profile rear wall and/or the extrusion profile base wall and/or the extrusion profile connection wall have a front wall and a back wall which are connected to one another by bracing walls. The front wall and the back wall preferably extend parallel to one another.

It is advantageous if the bracing walls extend perpendicular to the front wall and/or to the back wall.

Instead or additionally, the bracing walls can extend obliquely to the front wall and/or to the back wall. This is in particular advantageous if bracing walls are also present which extend perpendicular to the front wall and/or to the back wall. The bracing walls extending obliquely to the front wall and/or to the back wall preferably extend in the form of a zigzag line.

According to a further advantageous embodiment, the frame is provided with a guide housing for a base which is longitudinally displaceably supported therein. The guide housing can be in one piece with the frame. It can, however, also be releasably or non-releasably attached to the frame.

The base preferably is made from an extrusion profile. In this respect, the base can comprise those advantageous embodiments which were described for the frame.

In accordance with a further advantageous embodiment, a cover sheet is attached to the front side of the frame. The cover sheet is in particular attached to the front wall of the extrusion profile. It can act as a shielding sheet for the extrusion profile. The cover sheet is preferably manufactured from steel or from stainless steel. It can, anyhow, also be manufactured from another wear-resistant material.

It is advantageous if the cover sheet is galvanically separated from the extrusion profile. This is in particular advantageous when the extrusion profile comprises aluminum or a material which contains aluminum and when the cover sheet is made from steel or stainless steel or from another material which contains iron. In this case, the extrusion profile could corrode due to the contact with the protective sheet. The steel sheet can be powder coated at least on the side facing the extrusion profile for the galvanic separation and/or for corrosion protection. It is, however, also possible to provide the cover sheet with a paint layer, in particular by wet painting, at least on the side facing the extrusion profile. Instead of these measures, an adhesive can also be applied between the extrusion profile and the cover plate. This is in particular advantageous when the cover plate is fastened to the extrusion profile by adhesive bonding.

BRIEF DESCRIPTION OF THE DRAWINGS

Embodiments of the invention will be explained in detail in the following with reference to the enclosed drawing. There are shown in FIG. 1 a harvesting attachment in a perspective view from the front;

FIG. 13 the detail E from FIG. 8 in an enlarged view.

DETAILED DESCRIPTION OF THE INVENTION

Figure 1:
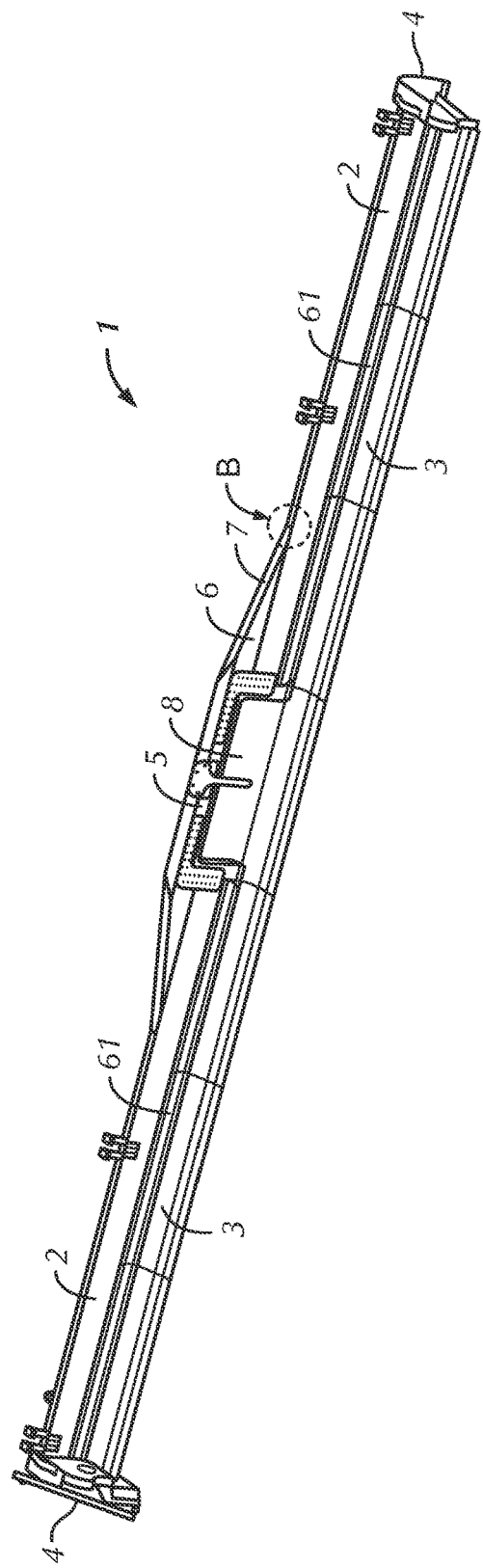

The harvesting attachment for a harvester, in particular for a combine harvester, shown in FIG. 1 comprises a frame 1 which has a rear wall 2 and a base wall 3. The frame 1 has an L-shaped angular form. The rear wall 2 extends substantially in the vertical direction and the base wall 3 extends substantially in the horizontal direction.

The longitudinal extent of the frame 1 corresponds to the working width. The frame 1 has side walls 4 at its ends.

Figure 4:
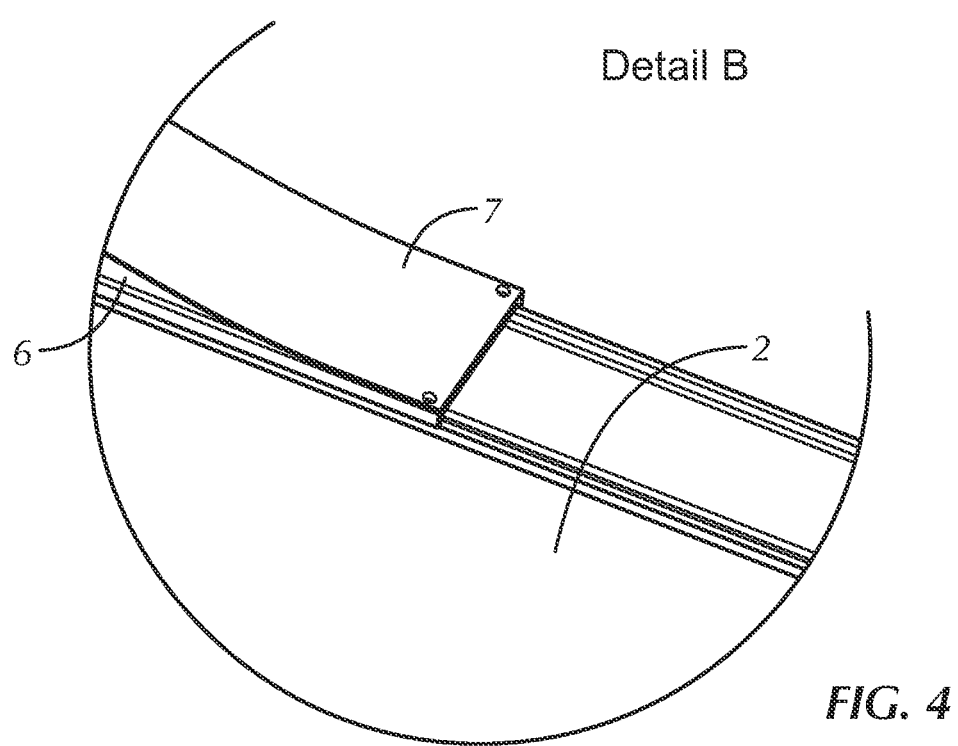
FIG. 4 the detail B from FIG. 1 in an enlarged view.

The rear wall 2 is provided with an elevated portion 5 at the center of the frame 1. The elevated portion 5 extends as a prolongation of the rear wall 2. It has laterally inclined portions 6. The inclined portions 6 are covered by a cover sheet 7, as shown also in FIG. 4.

Furthermore, a passage opening 8 is provided at the center of the rear wall 2 and is bounded on both sides by the rear wall sections, and by the base wall 3 and the elevated portion 5 as well. The passage opening 8 can serve to mount the frame 1 to the harvesting vehicle. The crop can further be conveyed through the passage opening 3 from the front side of the frame 1 to the harvesting vehicle. An auger (not shown in the drawing) can be provided in the frame 1 to convey the harvest.

Figure 2:
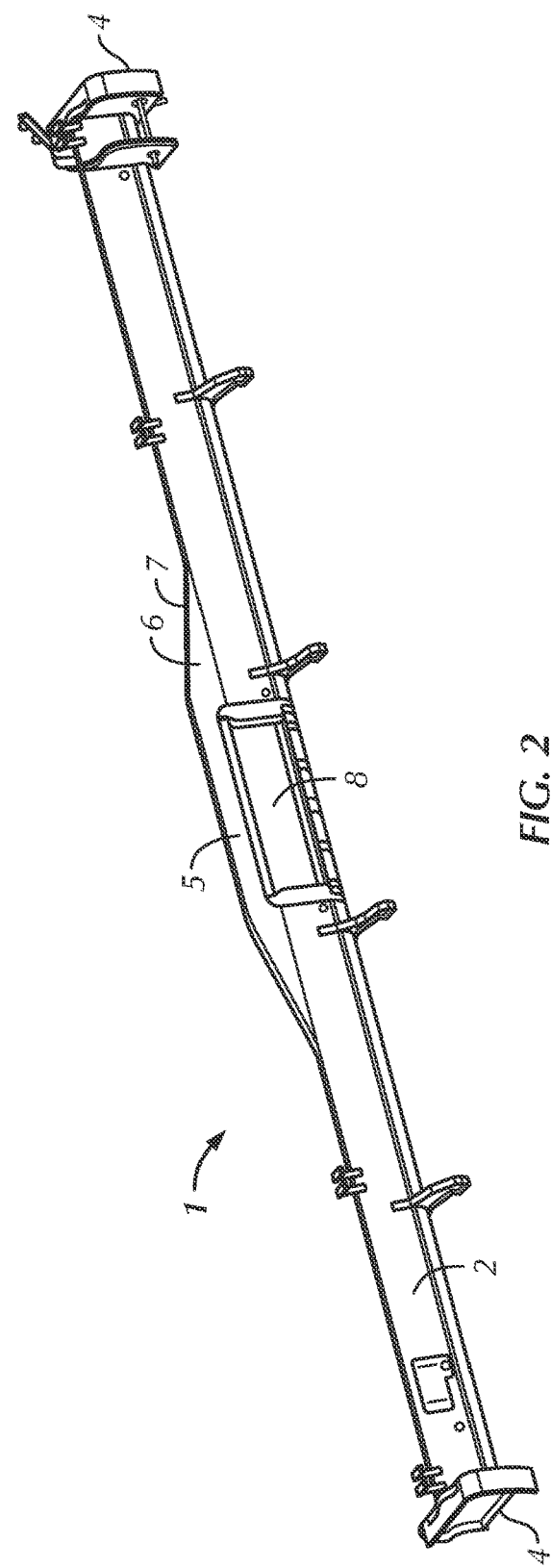
FIG. 2 the harvesting attachment according to FIG. 1 in a perspective view from the rear.

FIG. 2 shows the frame 1 in a perspective representation from the rear.

Figure 3:
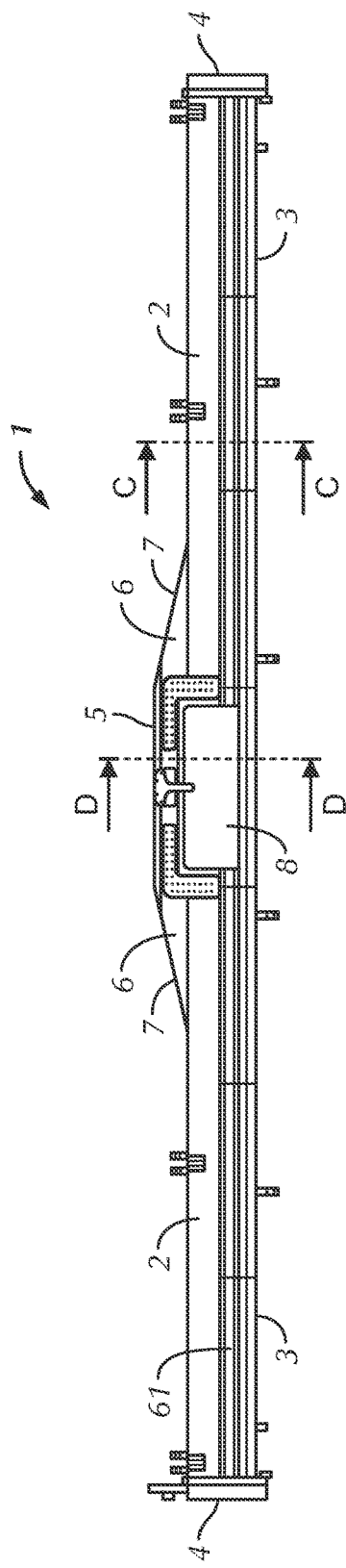
FIG. 3 the harvesting attachment according to FIGS. 1 and 2 in a view from the front.

The frame 1 is shown in a view from the front in FIG. 3.

Figure 5:
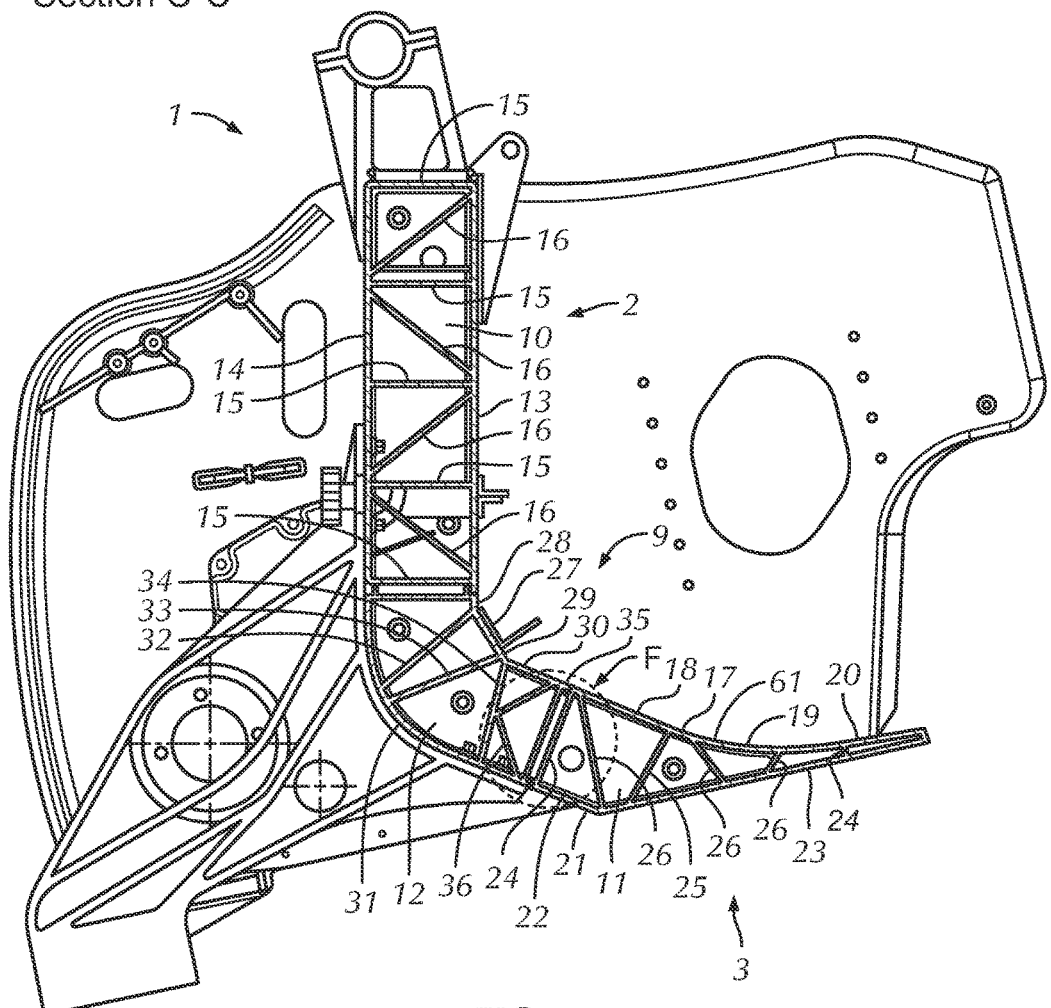
FIG. 5 a section along the line C-C in FIG. 3.
Figure 6:
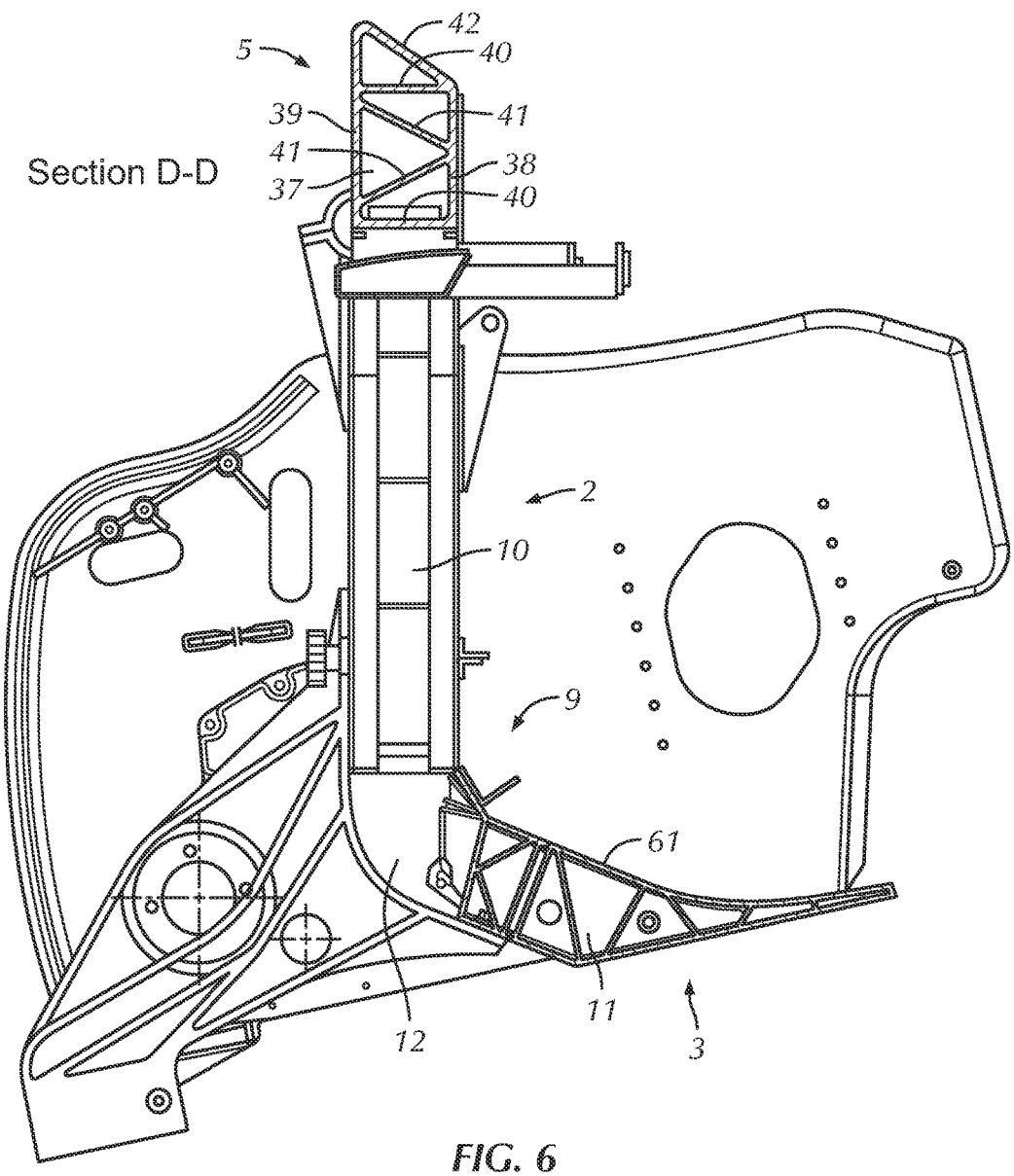
FIG. 6 a section along the line D-D in FIG. 3.

The frame 1 is formed as an extrusion profile as can be seen in particular from FIGS. 5 and 6. It is a light metal extrusion profile of aluminum or of a material containing aluminum. A curved connection wall 9 is present between the rear wall 2 and the base wall 3. The rear wall 2 and the base wall 3 are connected to one another by the connection wall 9.

The frame 1 is composed of a plurality of extrusion profile parts. These are an extrusion profile rear wall 10, an extrusion profile base wall 11 and a curved extrusion profile connection wall 12 which are connected to one another, actually welded to one another.

The extrusion profile rear wall 10 has a front wall 13 and a back wall 14. The front wall 13 and the back wall 14 extend parallel to one another. They are connected to one another by bracing walls 15 which extend perpendicular to the front wall 13 and to the back wall 14. The bracing walls 15 are spaced apart from one another, with the spacing of adjacent bracing walls 15 each being of equal size.

The front wall 13 and the back wall 14 are furthermore connected to one another by further bracing walls 16 which extend obliquely to the front wall 13 and obliquely to the back wall 14. An obliquely extending bracing wall 16 is present in every area between two adjacent bracing walls 15 and in each case extends diagonally through this field. The obliquely extending bracing walls 16 extend in a zigzag line.

The extrusion profile base wall 11 is designed in a similar manner. It has a front wall 17 and a back wall 21. The front wall 17 has a straight section 18 at the side facing the connection wall 12, said straight section merging in the direction away from the connection wall 12 into a curved section 19 and into a further straight end section 20 adjoining it. The back wall 21 has on the side facing the connection wall 12 a straight section 22 which extends parallel to the straight section 18 of the front wall 17. A further straight end section 23 adjoins the straight section 22 of the back wall 21 and extends at an angle thereto; its end is connected to the end of the straight end section 20 of the front wall 17.

The front wall 17 and the back wall 21 are connected to one another by bracing walls 24, 25 which extend perpendicular to the straight sections 18, 20 of the front wall 17. The outer bracing walls 24 also extend perpendicular to the straight sections 22, 23 of the back wall 21. The middle bracing wall 25 extends at an angle to the straight end section 23.

The front wall 17 and the back wall 21 are furthermore connected to one another by further bracing walls 26 which extend obliquely to the front wall 17 and obliquely to the back wall 21.

The connection wall 12 has a front wall 27 which comprises three straight sections which each extend at an angle to one another. The first straight section 28 is aligned with the front wall 13 of the rear wall 10; the third straight section 30 is aligned with the straight section 18 of the base wall 11. The second straight section 29 connects the first straight section 28 to the third straight section 30.

The back wall 31 of the connection wall 12 has the shape of a segment of a circle. It tangentially adjoins both the back wall 14 of the rear wall 10 and the back wall 22 of the base wall 11.

The connection wall 12 has a first bracing wall 32 which extends from the connection line of the straight sections 28, 29 of the front wall 27 to the center of the curved back wall 31. It furthermore has a second bracing wall 33 which extends from the connection line of the straight sections 29, 30 of the front wall 27 to the center of the curved back wall 31. The connection wall 12 furthermore has a further bracing wall 34 which extends from the connection line of the straight sections 29, 30 of the front wall 27 to the back wall 31 and a further bracing wall 35 which extends from the end of the straight section 30 facing the base wall 11 to the end of the back wall 31 likewise facing the base wall 11. The bracing walls 34, 35 extend perpendicular to the straight section 30 and perpendicular to the back wall 31.

Further bracing walls 36 are arranged in the field bounded by the bracing walls 34, 35. The bracing walls 36 extend obliquely to the straight section 30 and obliquely to the back wall 31. They are furthermore arranged in a V shape, with the tip of the V being at the center of the bracing wall 34.

The extrusion profile 37 of the elevated portion 5 is designed in a manner similar to the extrusion profile rear wall 10, as can be seen from FIG. 6. It has a front wall 38, a back wall 39, bracing walls 40 which extend perpendicular to the front wall 38 and to the back wall 39, and bracing walls 41 which extend obliquely to the front wall 38 and to the rear wall 39. The upper end wall 42 of the extrusion profile 37 extends obliquely to the front wall 38 and obliquely to the back wall 39, with the slope facing the side of the base wall 11.

Figure 7:
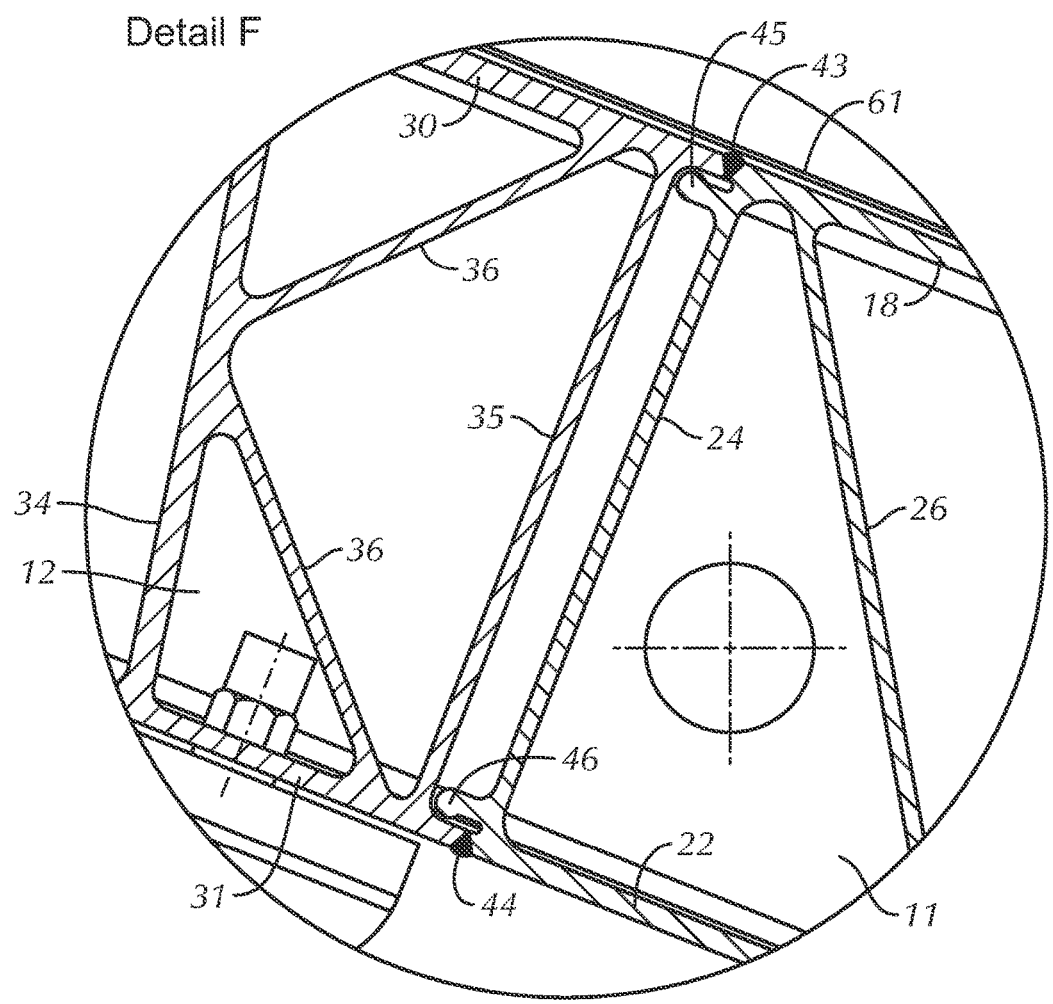
FIG. 7 the detail F from FIG. 5 in an enlarged view.

FIG. 7 shows the weld connection between the connection wall 12 and the base wall 11. The straight section 30 and the back wall 31 project beyond the bracing wall 35. They are aligned with the straight section 18 and with the straight section 22. The straight section 30 and the straight section 18 are positioned abutting one another. The weld seam 43 is located at the abutment line. It connects the straight section 30 to the straight section 18.

In a corresponding manner, the back wall 31 and the straight section 22 are positioned abutting one another. The weld seam 44 is located at the abutment line. It connects the back wall 31 and the straight section 22.

The bracing wall 24 connects the ends of the straight sections 18, 22. Positioning sections 45, 46 extend from the bracing wall 24 toward the connection wall 12. They have support heads at their ends which contact the inner sides of the straight section 30 and of the back wall 31. The end of the base wall 11 can in this manner be inserted into the end of the connection wall 12 that faces said end of the base wall, until the straight sections 30, 18 and the back wall 31 and the straight section 22 respectively come into abutment. This assembly movement is guided by the heads of the positioning sections 45, 46. The weld seams 43, 44 then can be applied.

Figure 8:
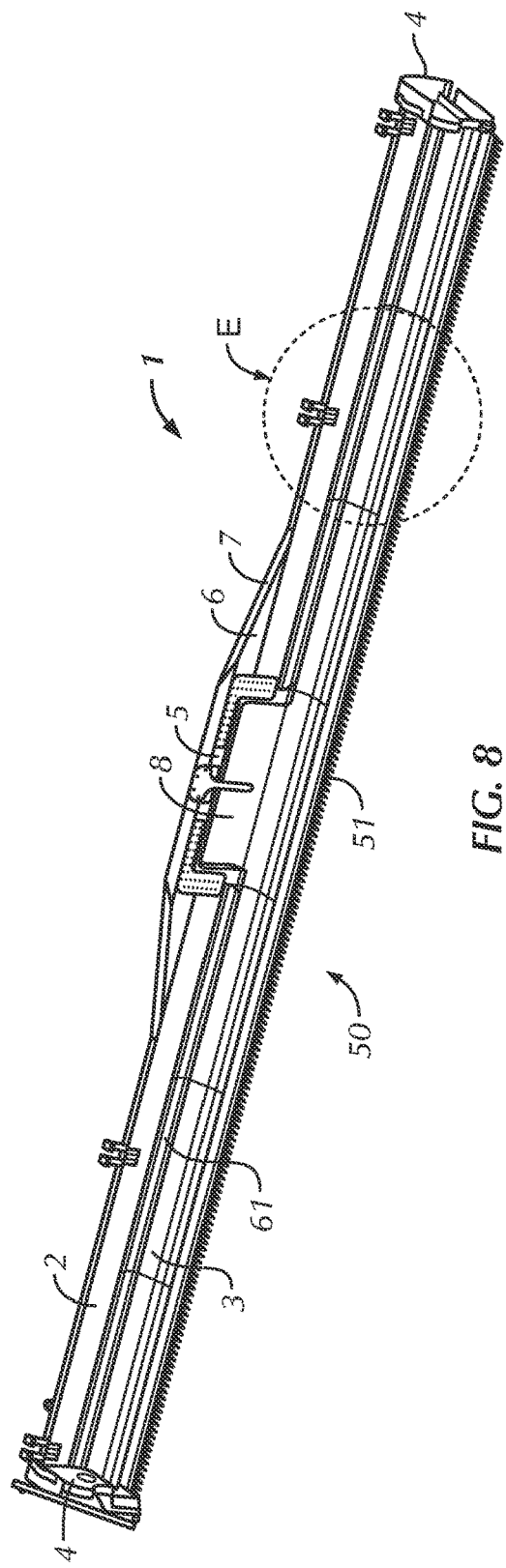
FIG. 8 the harvesting attachment according to FIGS. 1 to 7 provided with a base in a perspective view from the front.

FIG. 8 shows the harvesting attachment according to FIGS. 1 to 7 with an additional base 50. A cutter bar 51 is attached to the base 50.

Figure 9:
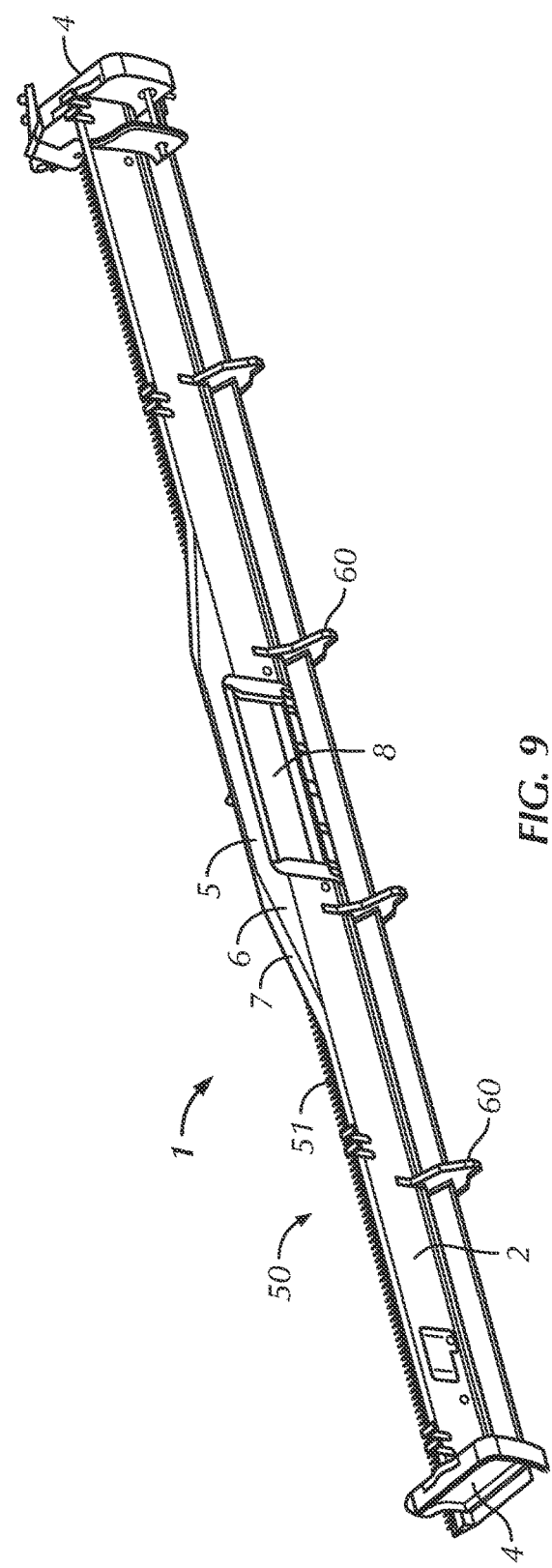
FIG. 9 the harvesting attachment according to FIG. 8 in a perspective view from the rear.

FIG. 9 shows the same frame in a perspective representation from the rear.

Figure 10:
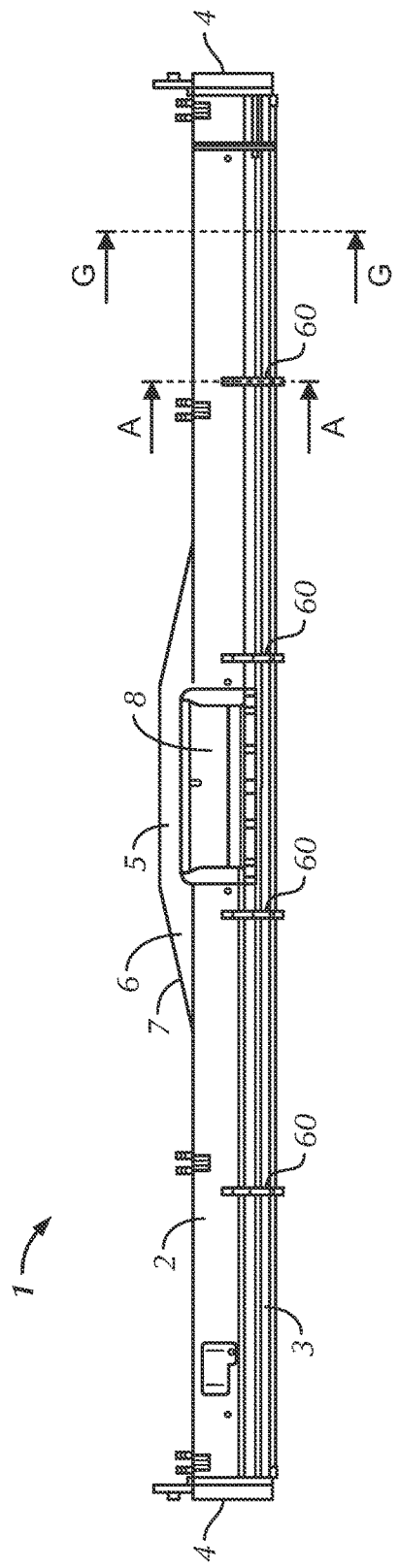
FIG. 10 the harvesting attachment according to FIGS. 8 and 9 in a view from the rear.

The frame 1 is shown in a view from the rear in FIG. 10.

Figure 11:
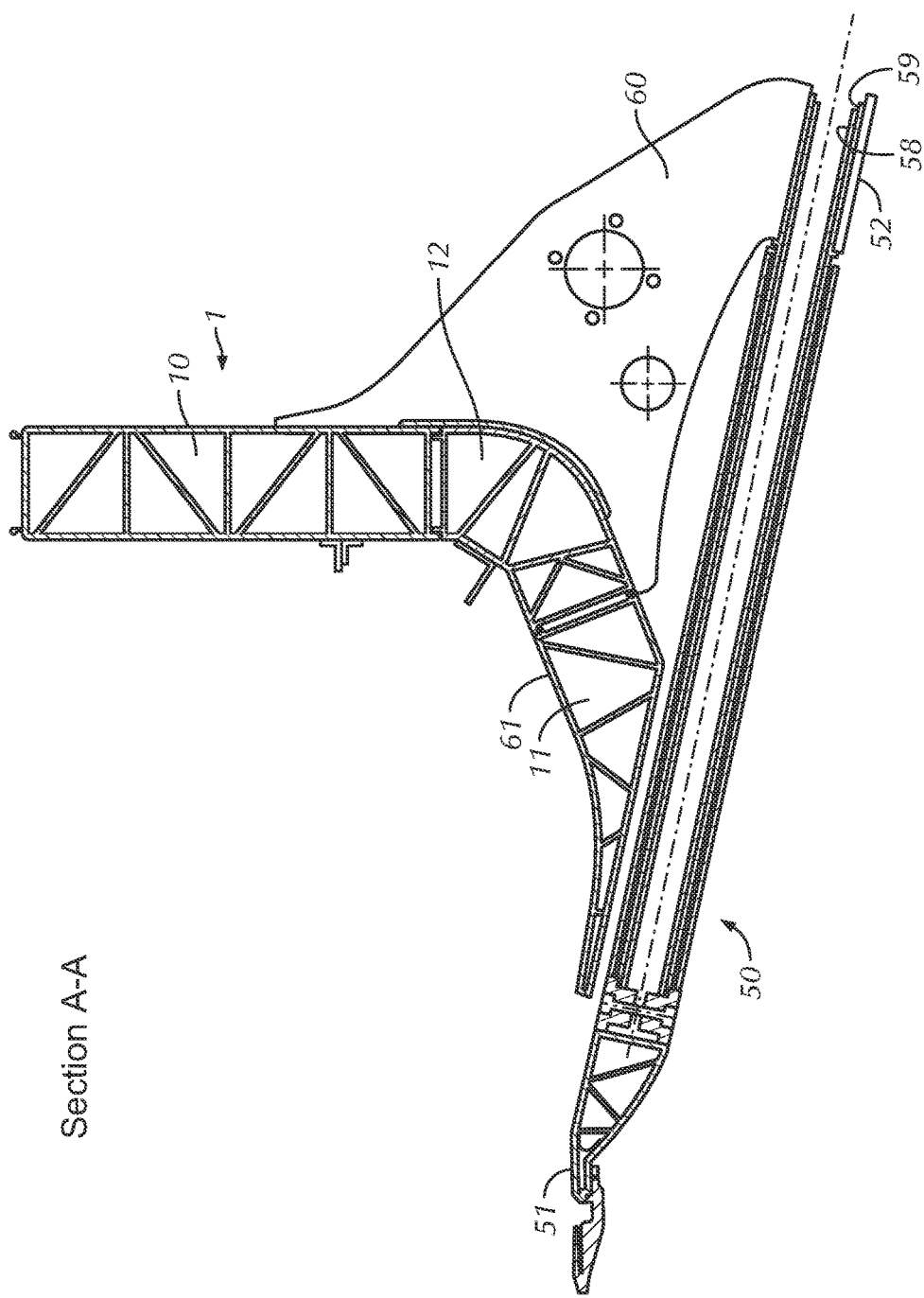
FIG. 11 a section along the line A-A in FIG. 10.
Figure 12:
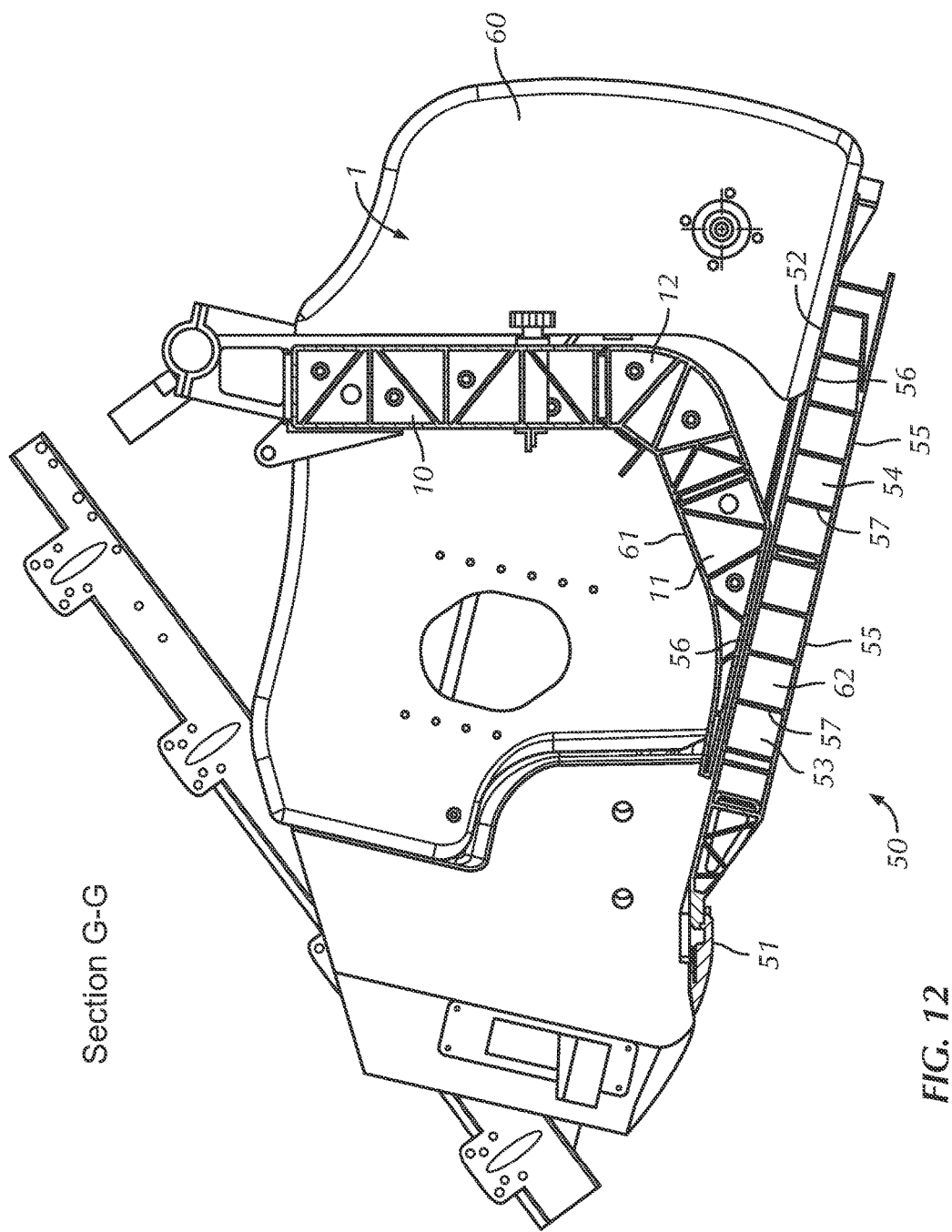
FIG. 12 a section along the line G-G in FIG. 10.

As can be seen from FIGS. 11 and 12, the base 50 is longitudinally displaceably supported in a guide housing 52. The base 50 is made as an extrusion profile 62. It includes a front section part 53 and a rear section part 54. The section parts 53, 54 are made from light metal, in particular from aluminum or from a material containing aluminum. They each have a front wall 55 and a back wall 56 which extend parallel to one another. The front wall 55 and the back wall 56 are connected to one another by bracing walls 57 which extend perpendicular to the front wall 55 and perpendicular to the back wall 56. The bracing walls 57 are spaced apart from one another, with the spacing of adjacent bracing walls 57 each being of equal size. The section parts 53, 54 are connected, in particular welded to one another.

The base 50 has guide sleeves 58 (FIG. 11) which are longitudinally displaceably supported in guide cylinders 59. The guide cylinders 59 are arranged fixed to the frame. They are fastened to cheeks 60 which are in turn fastened to the frame 1. The cheeks 60 are fastened to the rear wall 10 and to the connection wall 12.

A cover sheet 61 is attached to the front side of the frame 1. The cover sheet 61 is galvanically separated from the extrusion profile 10, 11, 12.

The extrusion profiles 10, 11, 12 extend over the total working width, hence over the total length of the frame 1.

The invention claimed is:

1. A harvesting attachment having a frame comprising:
   an elongated rear wall formed as an extrusion profile;
   an elongated base wall formed as an extrusion profile;
   an elongated curved connection wall curved in cross section formed as an extrusion profile;
   wherein each of said rear wall, base wall and curved connection wall have a front wall and a back wall.

2. A harvesting attachment according to claim 1, wherein the frame is formed as a light metal extrusion profile.

3. A harvesting attachment according to claim 1, wherein the frame is composed of a plurality of extrusion profile parts.

4. A harvesting attachment according to claim 3, wherein the extrusion profile parts are welded to one another.

5. A harvesting attachment according to claim 1, further comprising bracing walls connecting said front wall and back wall of said elongated rear wall, elongated base wall and said elongated connection wall.

6. A harvesting attachment according to claim 5, wherein the bracing walls extend perpendicular to at least one of the front wall and the back wall of said elongated rear wall, elongated base wall and elongated connection wall.

7. A harvesting attachment according to claim 5, wherein the bracing walls extend obliquely to at least one of the front wall and the back wall of said elongated rear wall, elongated base wall and elongated connection wall.

8. A harvesting attachment according to claim 1, wherein the frame is provided with a guide housing for a base that is longitudinally displaceably supported therein.

9. A harvesting attachment according to claim 8, wherein the displaceable base is formed as an extrusion profile.

10. A harvesting attachment according to claim 1, wherein the front wall is galvanically separated from the extrusion profile of said rear wall, base wall and said back wall.

11. A harvesting attachment according to claim 1, wherein said elongated rear wall has a passage opening located between the side walls of said elongated rear wall.

* * * * *